United States Patent
Camarota

(10) Patent No.: US 9,909,719 B2
(45) Date of Patent: Mar. 6, 2018

(54) LED LINEAR LIGHT ASSEMBLIES WITH TRANSPARENT BOTTOMS

(71) Applicant: Michael V. Camarota, Saugatuck, MI (US)

(72) Inventor: Michael V. Camarota, Saugatuck, MI (US)

(73) Assignee: ITC Incorporated, Holland, MI (US)

( * ) Notice: Subject to any disclaimer, the term of this patent is extended or adjusted under 35 U.S.C. 154(b) by 196 days.

(21) Appl. No.: 14/844,190

(22) Filed: Sep. 3, 2015

(65) Prior Publication Data

US 2016/0025278 A1 Jan. 28, 2016

Related U.S. Application Data

(63) Continuation-in-part of application No. 14/467,384, filed on Aug. 25, 2014, now Pat. No. 9,695,991.

(60) Provisional application No. 61/872,139, filed on Aug. 30, 2013.

(51) Int. Cl.
| | |
|---|---|
| *F21S 4/00* | (2016.01) |
| *F21K 99/00* | (2016.01) |
| *F21V 5/04* | (2006.01) |
| *F21V 15/01* | (2006.01) |
| *H05B 33/08* | (2006.01) |
| *F21V 19/00* | (2006.01) |
| *F21S 4/28* | (2016.01) |

(Continued)

(52) U.S. Cl.
CPC ............... *F21K 9/17* (2013.01); *F21S 4/28* (2016.01); *F21V 5/04* (2013.01); *F21V 15/012* (2013.01); *F21V 15/013* (2013.01); *F21V 19/0045* (2013.01); *H05B 33/0821* (2013.01); *F21Y 2103/10* (2016.08); *F21Y 2115/10* (2016.08); *Y02B 20/342* (2013.01); *Y10T 29/49* (2015.01)

(58) Field of Classification Search
CPC ................. F21K 9/17; F21S 4/28; F21V 5/04
USPC ........................................................ 362/233
See application file for complete search history.

(56) References Cited

U.S. PATENT DOCUMENTS

| | | |
|---|---|---|
| 3,984,923 A | 10/1976 | Rawson |
| 4,159,490 A | 6/1979 | Wood |
| 4,488,237 A | 12/1984 | Aronson |

(Continued)

FOREIGN PATENT DOCUMENTS

| | | |
|---|---|---|
| CN | 101482237 | 1/2008 |
| CN | 201954351 | 12/2010 |

(Continued)

*Primary Examiner* — Bao Q Truong
*Assistant Examiner* — Matthew Peerce
(74) *Attorney, Agent, or Firm* — Varnum, Riddering, Schmidt & Howlett LLP

(57) ABSTRACT

An LED linear light assembly (300) comprises an elongated LED linear light component (302) having a series of spaced-apart LEDs (306) mounted on a base (304). A housing (320) laterally encloses the LED linear light component (302). The housing (320) includes a curved section (324) having translucent properties for providing a lens for the LEDs (306). The housing (320) also includes a transparent and clear bottom section (322) coupled to or otherwise integrally formed with the curved section (324). The transparency of the bottom section (322) permits a user to sever the continuous LED linear light assembly (300) and form individual segments by viewing the appropriate cutting positions through the bottom section (322).

14 Claims, 11 Drawing Sheets

(51) Int. Cl.
*F21Y 103/10* (2016.01)
*F21Y 115/10* (2016.01)

(56) References Cited

U.S. PATENT DOCUMENTS

| | | | |
|---|---|---|---|
| 5,266,123 | A | 11/1993 | Brand |
| 5,363,865 | A | 11/1994 | Brand |
| 6,827,472 | B1 | 12/2004 | Myburgh |
| 7,045,971 | B2 | 5/2006 | Goto |
| 7,160,019 | B1 | 1/2007 | Kawakami |
| 7,253,444 | B2 | 8/2007 | Ikeda |
| 7,709,292 | B2 | 5/2010 | Sadwick |
| 7,726,868 | B2 | 6/2010 | Terada |
| 7,758,230 | B2 | 7/2010 | Terada |
| 7,768,658 | B2 | 8/2010 | Tsai |
| 7,815,359 | B2 | 10/2010 | Shimura |
| 8,134,675 | B2 | 3/2012 | Kawaguchi |
| 8,322,883 | B2 | 12/2012 | Cleaver |
| 2004/0184288 | A1 | 9/2004 | Bettis |
| 2004/0228135 | A1 | 11/2004 | Myburgh |
| 2005/0231947 | A1* | 10/2005 | Sloan ............... F21V 21/005 362/235 |
| 2008/0007945 | A1 | 1/2008 | Kelly |
| 2008/0159694 | A1 | 7/2008 | Payne |
| 2009/0073692 | A1 | 3/2009 | Berger |
| 2010/0201239 | A1 | 8/2010 | Mostoller |
| 2011/0176298 | A1* | 7/2011 | Meurer ............... F21K 9/00 362/218 |
| 2012/0170258 | A1 | 7/2012 | VanDuinen |
| 2012/0212954 | A1 | 8/2012 | Hirai |
| 2013/0018352 | A1 | 1/2013 | Wu |
| 2013/0082989 | A1 | 4/2013 | Song |
| 2013/0107526 | A1 | 5/2013 | Ishibashi |
| 2014/0313722 | A1 | 10/2014 | Eloff |

FOREIGN PATENT DOCUMENTS

| | | |
|---|---|---|
| WO | WO2011110217 | 9/2011 |
| WO | WO2012152640 | 11/2012 |

* cited by examiner

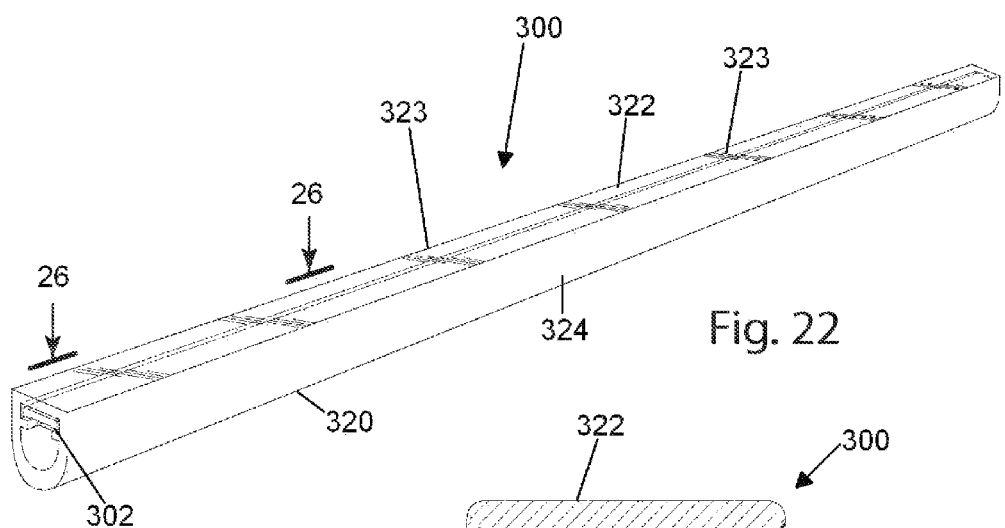
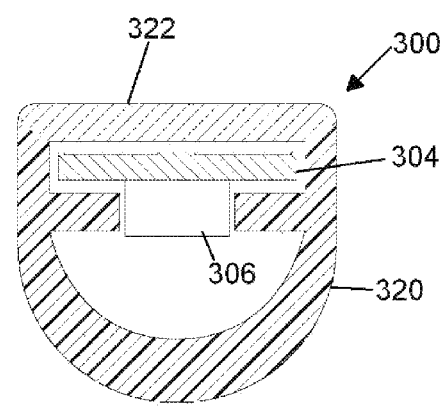
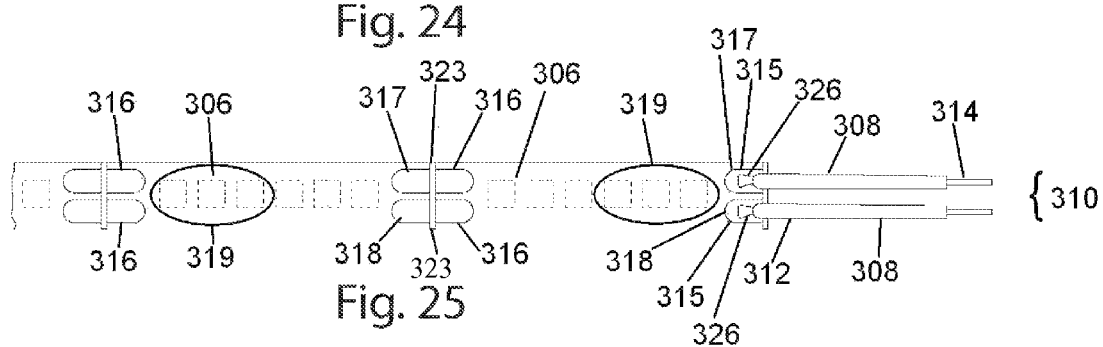

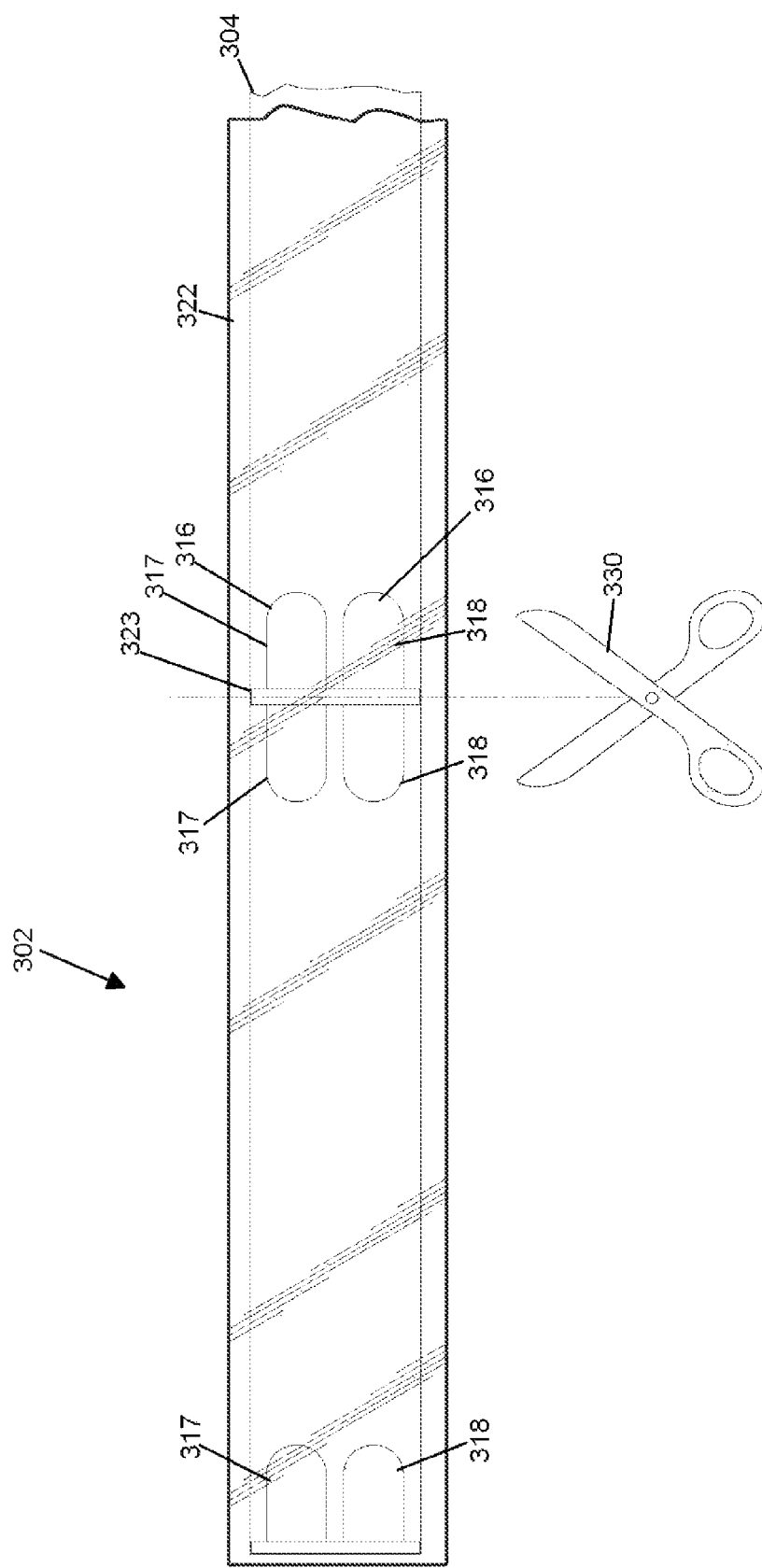

LED LINEAR LIGHT ASSEMBLIES WITH TRANSPARENT BOTTOMS

CROSS-REFERENCE TO RELATED APPLICATIONS

This application is a continuation-in-part of U.S. application Ser. No. 14/467,384, filed Aug. 25, 2014 which claims the benefit of U.S. Provisional Patent Application Ser. No. 61/872,139 filed Aug. 30, 2013, which are hereby incorporated in their entirety by reference.

BACKGROUND OF THE INVENTION

Field of the Invention

The invention relates to linear light assemblies utilizing LEDs, in addition to structure for facilitating the formation of light assembly segments from one or more parent or main LED linear light strips.

Background Art

As part of the background for the present invention, this application sets forth a detailed discussion of lighting configurations using flexible LED linear lights with diffusion properties. This subject matter is in a previously filed U.S. patent application which is commonly owned, granted application Ser. No. 14/467,384 and filed on Aug. 25, 2014. The application is titled DIFFUSED FLEXIBLE LED LINEAR LIGHT ASSEMBLY, Camarota, et cl. (the "Camarota application"). FIGS. 1-21 of this current application are drawings from the Camarota application. As will be made apparent from subsequent discussion herein, the invention to which this current application is directed differs substantially from the invention covered by the Camarota application. For example, the primary invention covered by the Camarota application is directed to a linear light assembly utilizing properties of diffusion. In contrast, and again as made apparent from subsequent discussion herein, the present invention does not necessarily employ diffusion techniques. However, an understanding of properties of diffusion is helpful in understanding some of the basic principles of linear light assemblies associated with the present invention. Further, the disclosure of the Camarota application, as replicated herein, describes a flexible light assembly and concepts associated therewith. Certain of these concepts and general concepts associated with flexible light assemblies as described in the Camarota application are incorporated within the present application. General background concepts associated with electrical lighting will now first be described.

Various types of electrical lighting systems have been known and developed throughout the years since the early days of Edison's inventions. Originally, most electrical lighting (in the form of light bulbs and the like) existed for functional and generally practical uses, namely to provide illumination in what would otherwise be relatively dark spacial areas. As electrical lighting development matured, alternatives to conventional light bulbs were the subject of numerous inventions and other developments. For example, and is apparent in many retail establishments, fluorescent lighting was developed. Fluorescent lamps or tubes are typically relatively low pressure mercury-vapor gas discharge lamps which use fluorescence to produce visible light. Electrical current in the gas excites mercury vapor which produces short-wave ultraviolet light. It then causes a phosphor coating on the inside of the bulb to fluoresce, thereby producing visible light. Fluorescent lighting typically converts electrical power into usable light much more efficiently than incandescent lamps.

Although fluorescent lighting is used in both retail and commercial establishments, they have some disadvantages. Often, fluorescent light fittings are relatively bulky, and inconvenient for use in restricted spaces such as display cases and the like. Also, such light fittings can have a relatively short life and require frequent maintenance. Still further, fluorescent lighting can operate at a somewhat hazardous high voltage, with respect to the requirements of a starter/ballast.

Fluorescent lamps and gas discharge lamps have existed for a significant period of time, originally being displayed by Tesla in 1893 at the World Columbian Exhibition. In 1897, Nernst invented and patented his incandescent lamp, based primarily on solid state electrical lights.

Other significant developments occurred throughout the 20th century. In 1901, Peter Hewitt demonstrated a mercury vapor lamp. In 1981, Philips first marketed what was characterized as compact fluorescent energy saving lamps, with integrated conventional ballast. In 1985, Osram, in competition with Philips, started to market an electronic energy saving lamp. Shortly thereafter, the "white" sodium vapor lamp was introduced.

Other developments included ceramic metal halide lamps (originally developed by a team at Nela Parc in 1992). In 1994, T-5 lamps having a cool tip were introduced and became the most popular fluorescent lamps, with what was considered to be excellent color rendering. Also developed in this timeframe was the first commercial sulfur lamp.

In addition to the foregoing developments, Nick Hollnyak is credited with developing the first practical spectrum Light Emitting Diode (LED) in 1962. However, in fact, the general LED has been around, at least at a theoretical level, since initially discovered back in the first decade of the 20th century.

Hollnyak is typically credited as the father of the modern LED. An LED can generally be defined as a semi-conductor light source. When an LED is switched on, electrons are able to recombine with holes within the device, releasing energy in the form of photons. This effect is commonly referred to as electroluminescence and the color of the light is determined by the energy gap of the semi-conductor. LEDs present many advantages over incandescent light sources, including lower energy consumption, longer lifetime, improved physical robustness, smaller size, and faster switching. LEDs have been used in numerous applications, as diverse as aviation lighting, digital microscopes, automotive lighting, advertising, general lighting, and traffic signals. Their high switching rates are also useful in advanced communications technology.

One use for LED configurations which has become more popular during the last several years is the application of LEDs for lighting fixtures which may provide some functional illumination, but also may primarily act as decorative lighting assemblies. LED configurations which are useful for decorative lighting assemblies are rigid LED linear lights and flexible LED rope lights, including both indoor and outdoor applications. Rigid LED lights comprise LEDs conventionally mounted on a structure which links the LEDs together both electrically and physically. A housing surrounding the LED strip often consists of a rigid PVC material. These rigid light strings are typically mounted through adhesive backings to the desired structures. In contrast, and as described in the section titled "Detailed Description of the Preferred Embodiments," the invention relates in part to a "flexible LED linear light assembly"

which utilizes a series of spaced apart and electrically linked LEDs which are mounted on a flexible printed circuit board. In addition to the flexible printed circuit board, the flexible LED linear light assembly further consists of a flexible housing or lens. Further, the LEDs may be surface mounted to a flexible polymer PCB. In contrast, flexible LED rope lights are assembled such that the LEDs are often attached to two buss wires.

Flexible LED linear lights can be utilized in many applications. For example, such lights can be applied as indoor lighting for outlining the edges of a kitchen counter, under-lighting baseboards in a movie theatre and similar applications. Flexible LED linear lights can also be utilized as outdoor lighting, including staircase lighting, outdoor patio or deck lighting, signage and outdoor artistic displays. Flexible LED linear lights are also suitable for use around a garden, pool, driveway, shed or the like. In addition, during holiday seasons, flexible LED linear lights can be readily used to create artistic messages or designs utilizing different colors and patterns.

One issue which arises with respect to the use of LEDs, and particularly a string of LEDs, relates to the concept that individual LEDs are effectively unidirectional hard-point light sources. Accordingly, an LED light string, standing alone, can exhibit both dark zones and "hot spots." It should be mentioned at this point that hot spots are not evident with the use of either florescent or neon tube lights. However, in other lighting assemblies which may be used, for example, as "under cabinet" lighting, hot spots can often show up on the counter top. Correspondingly, in wall wash lighting, the hot spots can show up as irregularities in the light patterns. Such hot spots have become more of a problem as LED brightness has increased in commercial products. To overcome these problems of LED hot spots, dark zones and overall light transmission uniformity, the LED lighting assembly can include a diffusion apparatus. The concept of diffusion for lighting apparatus relates to the transmission or reflection of electromagnetic radiation in the form of light, where the radiation is scattered in a number of different directions, and not totally reflected or refracted. Such activity is also referred to as "scattering" of light. The diffusion can also be referred to as a reflection or refraction of light (or other electromagnetic radiation) from an irregular surface or an erratic dispersion through a surface or other medium. Some of the assemblies which currently exist use what is characterized as "uniformity tape," which is a microstructured thin-shell mechanism for mixing and diffusing the light generated by the LEDs. It is particularly utilized in edge-lit digital displays, including monitors, televisions and signage. In these systems, light generated by the LEDs is attempted to be spread evenly to all parts of a display by a light guide, which may typically consist of a plate of polymethyl methacrylate. This guide transports light by total internal reflection, commonly referred as "TIR." Extraction patterns on the surface of the light guide will mete out the light and generate a uniform brightness distribution. However, even with the light guide, dark zones can be noticeable along the injection edge closest to the LEDs. Further, and somewhat obvious, dark zones will also influence the spacing between LEDs, which limits the ability of designers to reduce the number of LEDs in a display, despite what would exist as far as cost advantages and increased energy efficiency. Further, light-mixing of certain known light guides makes digital displays highly sensitive to variations in LED color and brightness. Still further, closely packed LEDs can also create thermal management issues.

In addition to issues associated with uniformity of diffusion for LED light strings and similar assemblies, issues also exist with respect to facilitating manufacture of diffused LED light strings. For example, the manufacturing process should preferably facilitate assembly of the LED light strings in positions desired within a housing comprising, for example, a translucent housing material. In addition, one problem which has existed in known assemblies relates to the fact that various LED lighting assemblies utilizing flexible LED light strings also utilize end cap structures which secure the ends of elongated housing and provide entry of electrical power into the housing interior for connection with the light string. During the manufacturing process, it is sometimes difficult to appropriately mount the end cap structure to the ends of the housing, with respect to their interfaces. For example, with certain mounting processes, areas which could be characterized as "steps" or other non-linear or non-continuous edges or other projections can be formed between the housing structure and the end cap structures. These formations can increase the difficulty of properly mounting the end cap structures to the housing, and can also take away from the overall aesthetics of the diffused light string assembly.

With the foregoing issues in mind, reference is now made to a number of patents and patent application publications which are associated with LED strings, translucent housing members and/or other optical and electrical principles. For example, the commonly assigned U.S. Patent Application Publication to VanDuinen et al., 2012/0170258, is directed to displays of case lighting having a lens with integrally formed features on its interior for purposes of mechanically retaining LED units within the interior. At least one of the LED units consists of a base and diodes mechanically engaged on a rigid PCB with integrally formed features of the lens. An electrical connector is provided to connect the LED units to a power source. At least one end cap incorporates the electrical connector. For purposes of sealing the assembly, a boot seal is provided for sealing the electrical connector and a plug cover is used to cover any unused electrical connectors which may be provided. An adhesive is used to secure the end cover to the lens and seal the connection therebetween. With this configuration, the lighting assembly is suitable for use in wet or potentially explosive environments.

Turning to other specific patent references, a number of the references teach general concepts associated with the use of LED light strings within translucent housing members. For example, the U.S. patent to Cleaver et al., U.S. Pat. No. 8,322,883, discloses an illumination device having a rod-like member with a light receiving surface and a light-emitting surface. An elongated light source extends along a position adjacent to a light receiving surface of the member, such that the light entering the member from the elongated light source and through the light receiving surface is scattered. This scattering process causes a light intensity pattern which appears substantially uniform along the light-emitting surface of the rod-like member. The Cleaver et al. patent is specifically directed to neon lighting, and has relevance only with respect to its discussion of point light sources and advantages of providing a light intensity pattern which appears substantially uniform along a light-emitting surface of a rigid rod-like member.

The U.S. patent to Ikeda, U.S. Pat. No. 7,253,444, is directed to a structure and process for manufacturing the structure which consists of a casing for use with a light-emitting unit. Ikeda discloses the concept of the unit having a substrate and light-emitting diodes housed within the casing. When silicone is injected through an injection opening, the silicone flows through the entirety of the housing, and then overflows from a discharge opening. The purpose for the silicone injection is to "push outside" air or air bubbles which have formed within the light-emitting unit.

The U.S. Patent Application Publication to Ishibashi et al., 2013/0107526 is directed to the use of cluster boards, with a series of LEDs mounted in an array on central parts of the boards in a transverse direction of the boards. The LED mounting portions in the first and second boards are formed so as to be bendable.

The U.S. Patent Application Publication to Mostoller et al., 2010/0201239 is directed specifically to an end cap configuration for a light tube having a LED light string. The end cap assembly includes an end cap connector extending from the body and holding contacts with first mating portions configured so as to be electrically connected to the circuit board, and second mating portions configured to electrically connect to the socket connector. The end cap assemblies of Mostoller et al. do not provide for any flush mounting of the cap with an outer surface of the housing profile.

The U.S. patent to Goto, U.S. Pat. No. 7,045,971, is directed to an illuminating apparatus having full-color LEDs, with a controller and power supply cable. The light emitting unit includes a series of light emitting elements having different emission colors. Other than showing a string of full-color LEDs for decorative purposes, the Goto patent does not appear to have any significant relevance.

The U.S. Patent Application Publication to Kelly, et al., 2008/0007945 is directed to a cabinet illuminator having a pair of LED lines. The LED lines are found in an elongated body having a heat transfer portion for conduction of heat from the LEDs to the outer surface of the body. An engagement configuration exists in the ends of the body for engagement with other structural members of a display cabinet. The end connectors do not appear relevant to the ITC invention.

The U.S. patent to Terada, et al., U.S. Pat. No. 7,758,230, discloses a spread illuminating apparatus having an LED, with a transparent resin plate and a light reflecting sheet. The plate includes slits adapted to have flap portions of the light reflecting sheet inserted therein. An adhesive tape with flexibility is placed along at least one flat portion of the reflecting sheet, so as to cover at least one slit of the resin plate. The light reflecting sheet is prevented from warping or undulating in spite of the difference in thermal expansion coefficients between the materials of the resin plate and the reflecting sheet. Light emitted from the LED and traveling in the resin plate is totally reflected by the flat portions, and thereby prevented from leaking from the outer side surfaces of the resin plate.

Other references include the following:
The U.S. Patent Application Publication to Berger, et al., 2009/0073692 is directed to a modular and expandable lighting system.
The U.S. Patent Application Publication to Payne, 2008/0159694 is directed to a lens configuration for optical touch systems.
The U.S. patent to Shimura, et al., U.S. Pat. No. 7,815,359, is directed to a spread illuminating apparatus utilizing a transparent resin plate.
The U.S. patent to Terada, et al., U.S. Pat. No. 7,726,868, is directed to a spread illuminating apparatus, and is primarily related to a method of injection molding for the transparent resin plate.

The U.S. patent to Kawakami, U.S. Pat. No. 7,160,019, is directed to a side-lighting surface light source device, along with a manufacturing method for the same. The device includes a light source, reflective member, and light guide plate.

The following patents are directed to various types of display devices utilizing LED configurations.
Song, et al., Publication No. 2013/0082989;
Kawaguchi, et al., U.S. Pat. No. 8,134,675;
Myburgh, U.S. Publication No. 2004/0228135.

Other patents utilizing LED string apparatus include the following:
Sadwick, et al., U.S. Pat. No. 7,709,292;
Rawson, et al., U.S. Pat. No. 3,984,923;
Aronson, et al., U.S. Pat. No. 4,488,237;
Brand, U.S. Pat. No. 5,266,123;
Brand, U.S. Pat. No. 5,363,865;
Myburgh, U.S. Pat. No. 6,827,472;
Wood, U.S. Pat. No. 4,159,490;
Bettis, 2004/0184288;
Yoshida, et al., 2013/018352;
Tsai, et al., U.S. Pat. No. 7,768,658.

One issue which arises in the manufacture and use of linear LED light assemblies (independent of diffusion properties) relates to each individual LED linear light assembly having appropriate positioning of individual LED components on LED light strips after formation by severing a "parent" or "main" LED linear light assembly at various cut lines along the main assembly. This issue, and the advantages provided by embodiments in accordance with the invention for resolving this issue, are discussed in greater detail in subsequent paragraphs herein.

SUMMARY OF THE INVENTION

In accordance with the invention, an LED linear light assembly is adapted for use as an LED-based source of light for utilitarian and/or decorative purposes. The linear light assembly includes an elongated LED linear light component. The light component includes a series of spaced-apart LEDs mounted on a base.

A housing is provided, which has an elongated configuration and includes a first section with at least some translucent properties. A second section forming a housing bottom is coupled to or otherwise integrally formed with the first section. The LED linear light component is laterally enclosed by the housing and extends longitudinally through an interior of the housing. In accordance with certain concepts of the invention, the housing bottom is sufficiently transparent so that a user desiring to cut the linear light assembly into one or more segments can visualize appropriate cut positions on said linear light component.

The LED linear light assembly can include certain indicia which provides for a visual indication to the user as to appropriate cut positions on said linear light assembly. In accordance with other concepts of the invention, conductors are provided which electrically connect the circuitry of the LED linear light component with a source of electrical power. The conductors can be configured so as to form positive and negative paths.

The individual LEDs can be formed in clusters, with each cluster comprising a predetermined number of LEDs. The LEDs associated with a single cluster can be connected together in a series circuit configuration. Correspondingly, separate LED clusters can be connected in parallel configurations, relative to each other.

The entirety of the housing, comprising the first and second sections, with the second section forming a transparent bottom, can be formed through a single extrusion process, with the bottom being co-extruded with the first section. In such an embodiment, the first section and the bottom transparent section may be extruded together as a unitary piece with the first and second sections having different translucence. Alternatively, a manufacturing process can be used in accordance with the invention, which comprises the separate extrusion of the transparent bottom of the housing, from the extrusion process which forms the first section. In this embodiment, the LED linear light component, rather than being inserted through an end of the formed housing, can be layed into the interior of the first section of the housing before the clear bottom is coupled to the first section. With this manufacturing process, the need for inserting or otherwise threading the linear light component into an end of the housing can be avoided.

BRIEF DESCRIPTION OF THE DRAWINGS

The invention will now be described with respect to the drawings, in which:

FIG. 8 is an upper, perspective view of the end cap lead in;

FIG. 9 is an elevation view of the end cap lead in shown in FIG. 8, as viewed from the interior of the diffused flexible LED linear light assembly, and looking outwardly toward the interior face of the end cap lead in;

FIG. 22 is a perspective view of a continuous LED linear light assembly in accordance with the invention;

FIG. 23 is an end view of the continuous LED linear light assembly shown in FIG. 22 and taken along lines 23-23 as a cross-section thereof;

FIG. 24 is a plan view of the continuous LED linear light assembly shown in FIG. 22;

FIG. 25 is an enlarged view of a cut LED linear light assembly in accordance with the invention, and comprising an enlarged view of the section of FIG. 24 shown within the enclosed oval 25; and FIG. 26 is a plan view of a portion of the continuous LED linear light assembly shown in FIG. 22, taken along section lines 26-26 of FIG. 22 and showing an enlarged view of the cut assembly.

DETAILED DESCRIPTION OF THE PREFERRED EMBODIMENTS

The principles of the invention are disclosed, by way of example, in LED linear light assemblies with transparent bottoms. The various elements of the LED linear light assemblies in accordance with the invention are illustrated in FIGS. 22-26, and disclosed in subsequent paragraphs herein. A substantial advance in LED linear light technologies is the subject of the U.S. patent application Ser. No. 14/467,384, Camarota filed Aug. 25, 2014 and titled DIFFUSED FLEXIBLE LINEAR LIGHT ASSEMBLY. This application is commonly owned and is referred to herein as the "Camarota Application." For purposes of providing substantial detailed background for the invention covered by this application, the Camarota Application is disclosed in substantial detail in the immediately following paragraphs, and is also the subject of FIGS. 1-21 of this application.

With reference first to FIGS. 1-7, a diffused flexible LED linear light assembly 100 includes what can be characterized as a flexible LED linear light component 102. The basic design of a flexible LED linear light comprises a series of electrically connected LEDs mounted on a flexible printed circuit board (or "PCB"). In addition to the flexible printed circuit board, the flexible LED linear light also includes a flexible translucent housing or lens which essentially encases the flexible LED linear light printed circuit board.

Figure 20:
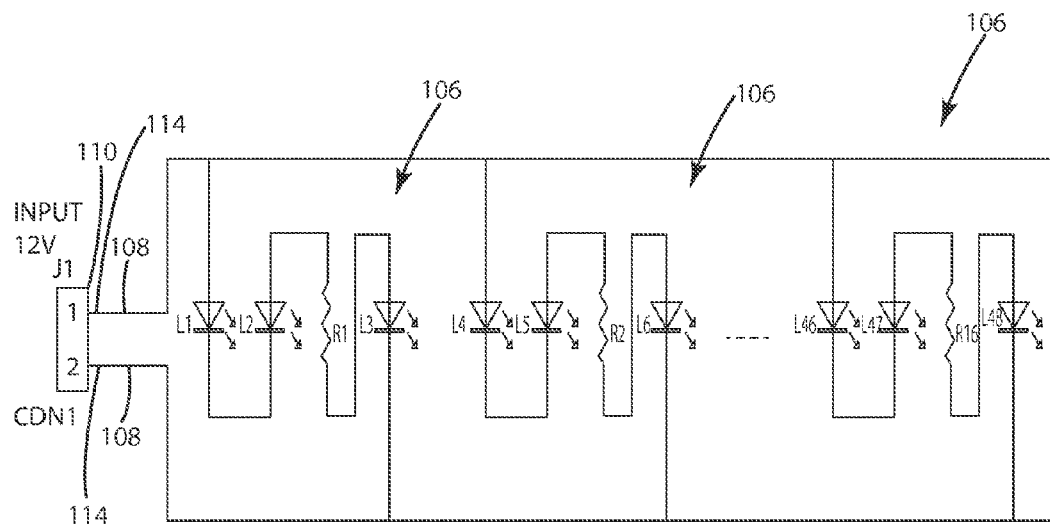
FIG. 20 is a partial schematic drawing illustrating several of the LED elements and their circuit connections to an external power source, as they are associated with the flexible LED linear light.
Figure 21:
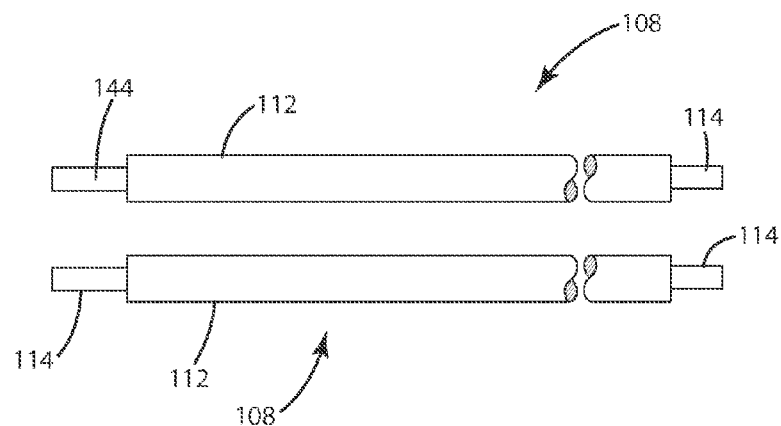
FIG. 21 is an enlarged view of the electrical pigtails shown in FIG. 6, which electrically connect the flexible LED linear light to an external power source.

The flexible LED linear light component 102 illustrated in the drawings comprises an elongated and generally rectangular flexible base 104, with individual LEDs 106 spaced longitudinally along the elongated direction of the component 102. Each of the LEDs is in the form of a conventional diode configuration. FIG. 20 is a relatively simplified schematic diagram of the circuitry of the LEDs 106. If desired, the LEDs 106 may include a flexible polymer-based printed circuit board, where the LEDs 106 are mounted on the base 104 for a relatively low profile design and small, but efficient size. The base 104 and LEDs 106 may be manufactured in various lengths and widths, so as to accommodate the desired height and sizing of the flexible LED linear light assembly 100.

Figure 5:
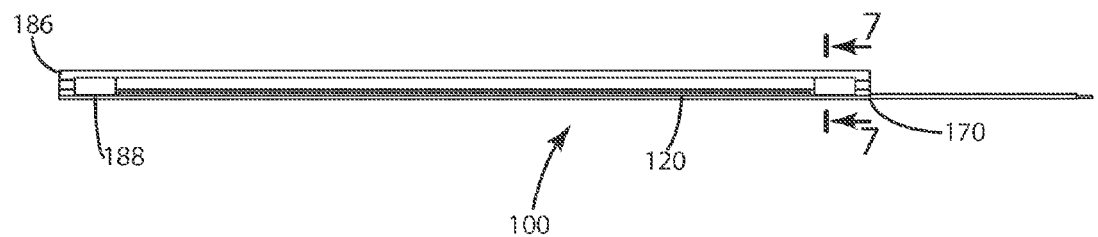
FIG. 5 is a plan elevation view of the diffused flexible LED linear light assembly illustrated in FIGS. 1-4.
Figure 6:
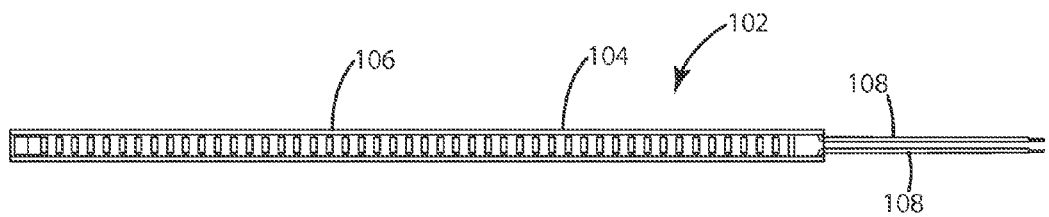
FIG. 6 is a partial plan view of the diffused flexible LED linear light assembly shown in FIG. 5, but specifically showing the flexible LED linear light, individual LEDs, and connector cables to an external power source.

In addition to the base 104 and the LEDs 106, the flexible LED linear light component 102 can also be characterized as including or otherwise being connected to a pair of electrical connectors, commonly referred to as "pigtails." The electrical pigtails utilized with the light assembly 100 are illustrated as they are connected to the flexible LED linear light component 102 in FIGS. 5 and 6. These pigtails are also primarily functionally shown in FIG. 20 as being interconnected between the LEDs 106 and an external source of electrical power 110. In addition, the electrical pigtails 108 are expressly shown in a stand-alone configuration in FIG. 21. Each of the pigtails 108 is shown as having a protective cable or sheath 112 surrounding and encasing conductive wires of connectors 114. The portion of the conductive wires 114 which are exposed are formed by "stripping back" the cable sheaths 112 from the wires 114. One end of the wires 114 will be connected to one end of the string of LEDs 106 through the base 104. The other ends of the conductive wires 114 will be connected to the external source for electrical power 110 shown in FIG. 20. As an alternative, a miniature surface mounted connector could also be utilized as a means to provide the electrical connection, should the need arise.

In addition to the LED component 102 and the electrical pigtails 108, the diffused flexible LED linear light assembly 100 further comprises a partially translucent housing 120 which is utilized to house and encase the flexible LED linear light component 102, as well as one set of ends of the electrical pigtails 108. For purposes of brevity in description, the "partially translucent housing" 120 will be referred to herein as the "translucent housing." In addition to housing and encasing the flexible LED linear light component 102 and one set of ends of the electrical pigtails 108, the translucent housing 120 also serves to function as a partially translucent lens for the light emitted from the LEDs 106 of the flexible LED linear light component 102. Still further, the translucent housing 120 functions so as to exhibit a certain level of diffusion of the light emitted from the LEDs 106. The overall shape and structure of the translucent housing 120 is shown in various figures of the drawing, including FIGS. 1, 2, 4, 5, 7 and 17-19. The translucent housing can be constructed of a number of different materials, including a flexible polymer such as silicone 535U.

With reference particularly to FIGS. 2, 4, 7 and 19, the translucent housing 120 comprises one "side" which can be characterized as a flat base section 122. The flat base section 122 can be of an opaque formulation and, given the positioning of the LEDs 106, does not exhibit any translucent properties. With reference to the positioning shown in FIG. 4 in cross-sectional configuration, extending upwardly from both sides of the flat base section 122 is a translucent curved section 124. The curved section 124, along with the base section 122, completes a lateral enclosure of the flexible LED linear light component 122.

Figure 4:
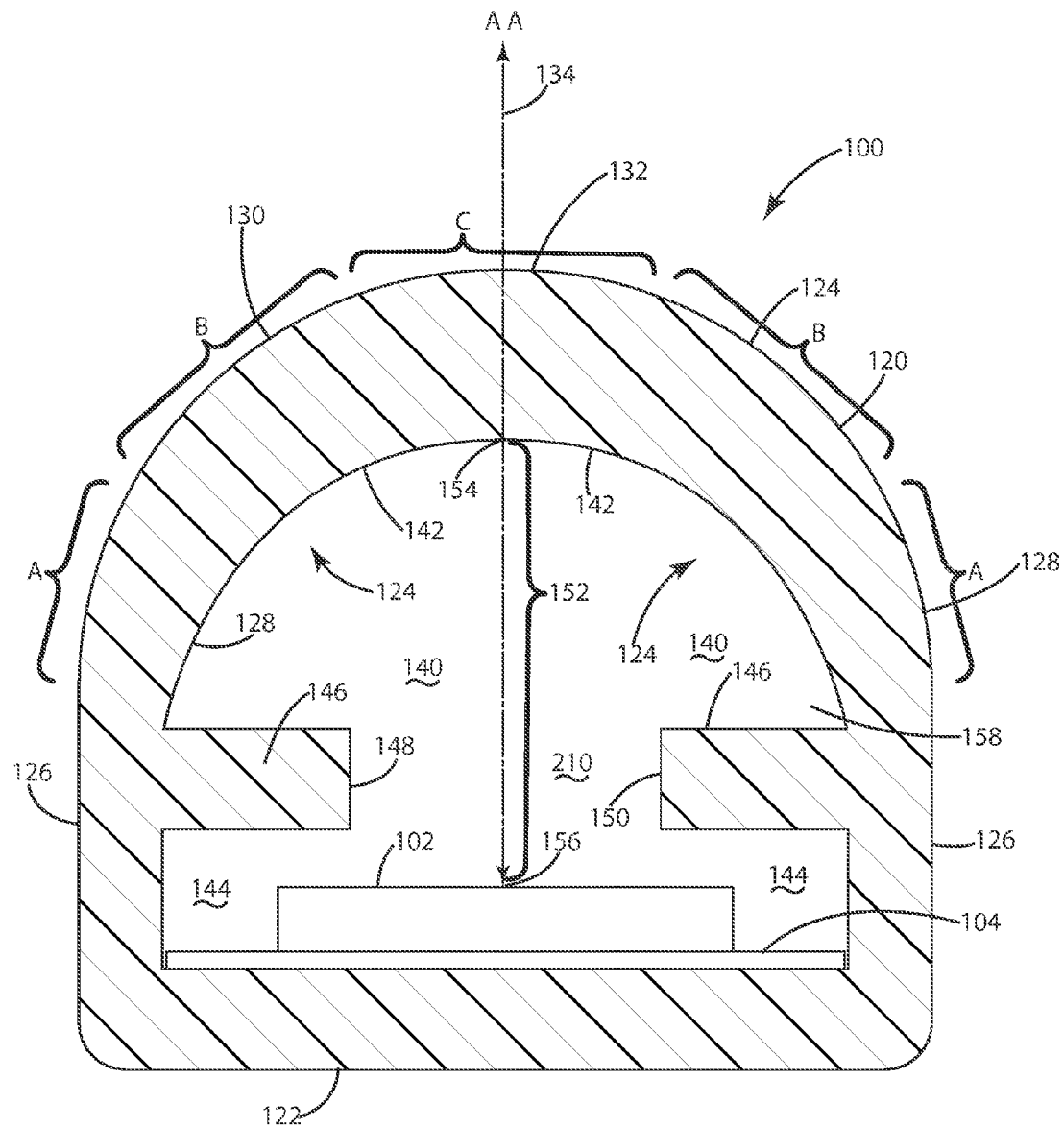
FIG. 4 is an end view of the translucent housing structure, with the flexible LED linear light positioned therein, and specifically showing the variation in the thickness of the translucent portion of the housing structure in a cross-section taken along an axial direction.

The curved arcuate section 124 of the translucent housing 120 varies in thickness (in a cross-sectional configuration) in its lateral surfaces. The variation in thicknesses along the curved section 124 is particularly shown in FIGS. 4, 7 and 19. For purposes of description of these thickness variations, FIG. 4 shows the curved arcuate section 124 as being divided among various segments along the housing 120. Specifically, FIG. 4 first shows a pair of base connecting segments 126, which could be characterized as being connected to or otherwise integral with the ends of the flat base section 122 and depending upwardly (as viewed in FIG. 4) therefrom. These base connecting segments 126 can be relatively constant with respect to thickness. Again with respect to the viewing direction of FIG. 4, extending upwardly from the base connecting segments 126 are segments 128. The segments 128 are illustrated on FIG. 4 as extending along the outer surface of the housing 120 for a distance A. As further shown in FIG. 4, the thickness of the segments 128 vary and increase from the upper portion of the base connecting segments 126 to what is shown in FIG. 4 as the upper portions of segments 128. For purposes of the description, the average thickness of each of the segments 128 can be characterized as thickness X. Although not of an absolute necessity in accordance with the invention, the segment 128 shown on the left side of FIG. 4 can essentially be a mirror image of the segment 128 shown on the right side of FIG. 4. Accordingly, each of these segments 128 has a length along the housing surface of A, with an average thickness of X. Again, it is emphasized that the references to these various segments and thicknesses are solely for purposes of description, and the actual translucent housings 120 do not necessarily have any structural differentiation among these segments, other than the relative relationships with respect to housing thicknesses.

Extending upwardly from the top of each of the segments 128 are further segments which can be characterized as segments 130. As again shown in FIG. 4, the segments 130 extend upwardly along the curved arcuate section 124 of the housing 120, and are illustrated in FIG. 4 as having a segment length B. Again for purposes of the description, the average thickness along the length B of the segments 130 can be characterized as thickness Y. In accordance with the invention, the average thickness Y of the segments 130 will be greater than the average thickness X of the segments 128.

Continuing with reference to FIG. 4, the translucent curved arcuate section 124 of the translucent housing 120 includes a segment 132 which extends upwardly from the upper portions of segments 130 and interfaces with each of the upper portions of segments 130. The segment 132, consisting of the "uppermost" portion of the translucent housing 120, is shown in FIG. 4 as having a length C along the surface of the housing 120. For purposes of description of the invention, the segment 132 can be characterized as having an average thickness Z. In accordance with the invention, the average thickness Z will be greater than the average thickness Y which, in turn, was previously described herein as being greater than the average thickness X.

Figure 1:
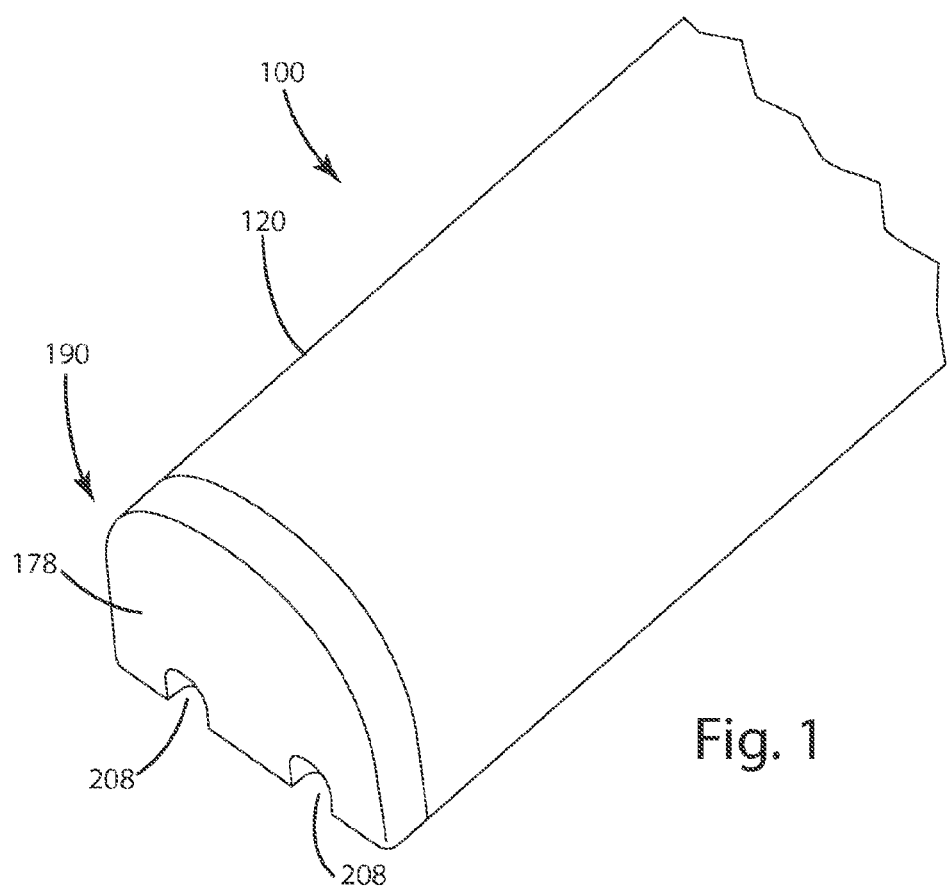
FIG. 1 is a left-side perspective view of a partial length of a diffused flexible LED linear light assembly.
Figure 2:
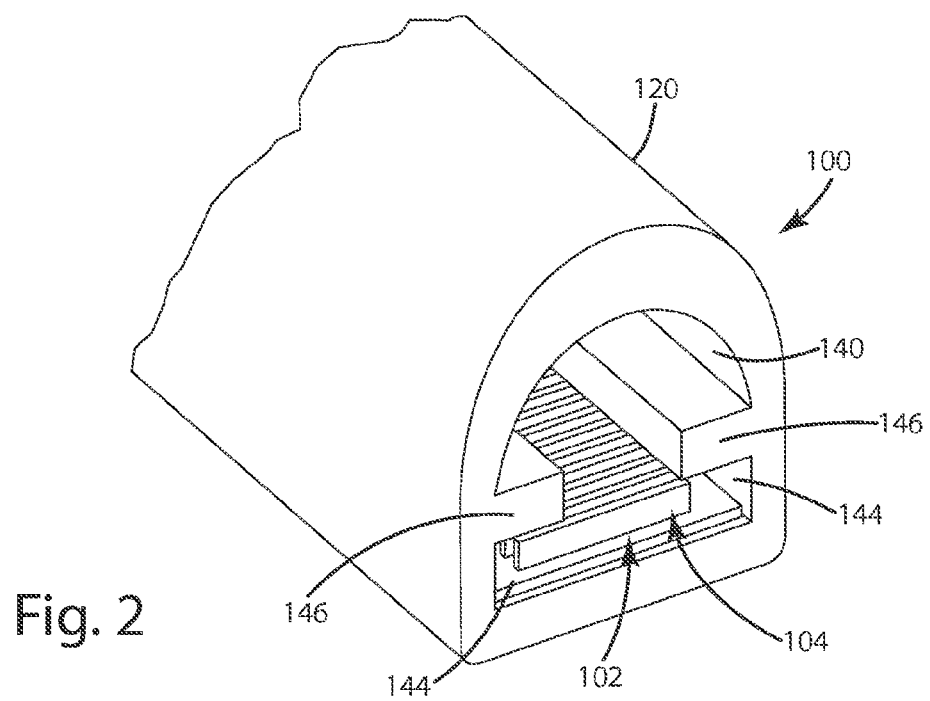
FIG. 2 is a right-side perspective view of the diffused flexible LED linear light assembly shown in FIG. 1, but further showing a partial interior of the flexible LED linear light assembly, with FIG. 2 showing one end of a translucent housing, with an end cap omitted from the end of the housing, and therefore partially showing an interior of the translucent housing, with the flexible LED linear light located against the bottom of the "D-shaped" translucent housing, and further showing a pair of opposing inner projections which serve to locate the flexible LED linear light within a channel formed by the two opposing projections.
Figure 3:
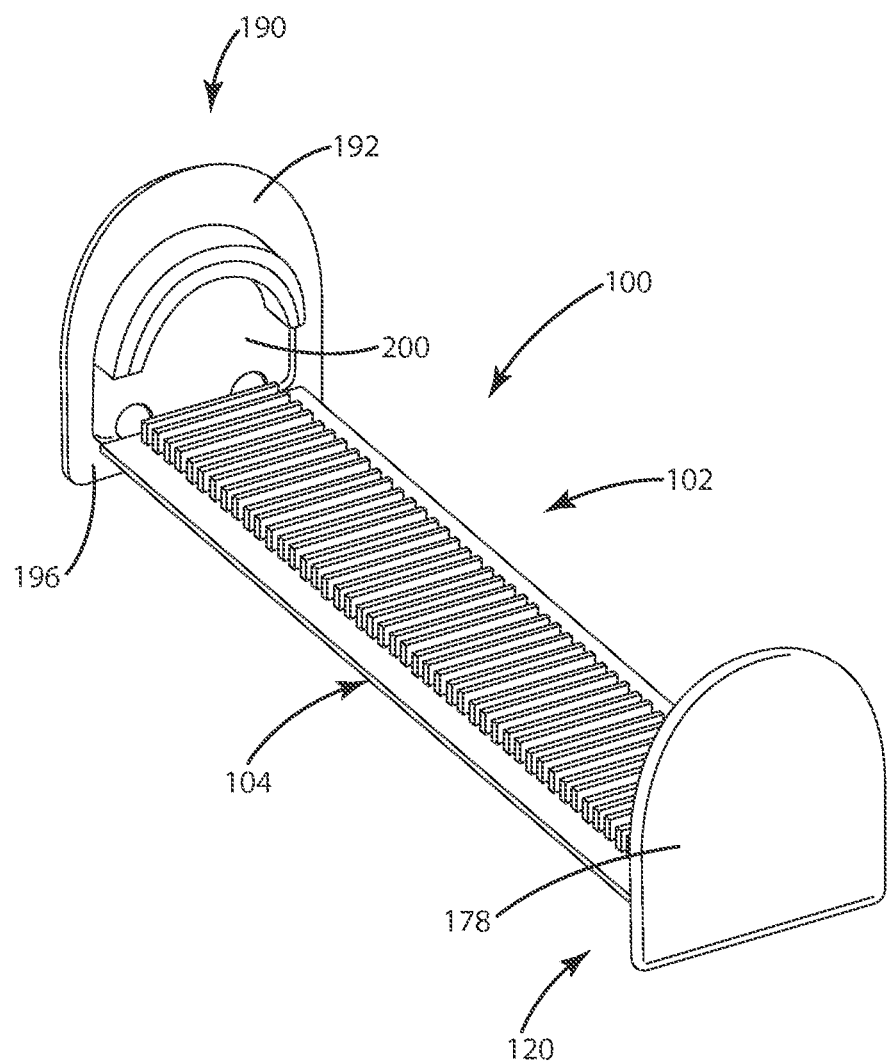
FIG. 3 is a perspective view of the flexible LED linear light assembly shown in FIG. 1, showing one of the end caps, and further with the omission of the translucent housing structure.
Figure 7:
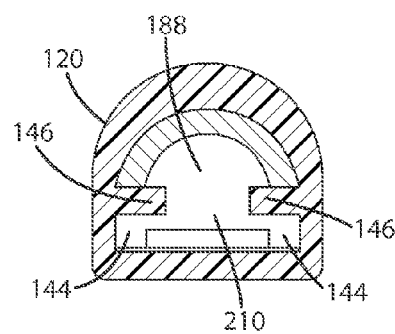
FIG. 7 is a sectional end view of the diffused flexible LED linear light assembly shown in FIG. 5, taken along section lines 7-7 of FIG. 5.

The LEDs 106 and the elongated base 104 are positioned within the interior of the translucent housing 120 as particularly shown in several of the drawings, including FIGS. 1 and 7. With this configuration, and assuming that the thickness of the translucent section 124 of the housing 120 was uniform along its circumference in the axial direction, the intensity of the light transmitted to the interior surface of the translucent section 124 would be greatest at the center of segment C, corresponding to a direction to which is perpendicular to the transmitting plane of each of the LEDs 106. That is, the intensity of the light of the LEDs 106 as it impinges on the interior surface of the translucent section 124 is greatest along what is shown as axis AA, or axis 134 in FIG. 4. Further, in accord with this same concept, the photometric profile of each of the LEDs 106 will typically form a bell-shaped array which is centered along axis AA and will be of an approximately 120 degree included angle. That is, as the angle of the LED light rays move away from the perpendicular angle formed by axis AA (i.e., the light ray angle moves from the area of segment C to the areas of segments B and A), the natural light intensity of each of the LEDs 106 will decrease. This can result in a significant disadvantage with respect to the aesthetics of the resultant light distribution outside of the flexible LED linear light assembly. Further, to the extent that the flexible LED linear light assembly 100 is being used in a functional manner so as to provide light for a practical purpose, the drop off of light intensity away from axis AA also is a significant disadvantage.

To overcome these problems, the translucent housing 120, as particularly shown in FIGS. 4 and 7, is constructed with the thickness of the housing 120 varying along the areas corresponding to segments A, B and C. Preferably, the thickness variation curve is relatively "smooth" and "steps" or other irregularities in the photometric profile curve are not exhibited. In accordance with the foregoing, the average thickness Z of segment C shown in FIG. 4 will be greater than the average thickness Y of each of the segments B. Correspondingly, the segments A will have an average thickness X which is less than the average thickness Y and the average thickness Z. By appropriately varying the foregoing thicknesses of the translucent housing 120 in cross section, a higher percentage of light transmission through the body of the translucent housing will occur within segments A, as compared to the percentage of light transmission allowed to pass through the translucent housing 120 at the locations of segments B. In turn, the percentage of light transmission allowed to pass through the translucent housing 120 in the areas of segment C will be less in percentage than the percentages of transmission in segments B and A. With these differences in the percentages of light transmission through the thicknesses of housing 120, it is therefore possible to generate and provide for a uniform intensity of the LED light output throughout the transmission area corresponding to the 120 degree included angle. That is, it has been found that by varying the thickness of the housing 120 in cross section, higher percentages of light transmission in areas having the relatively "weakest" LED output strength is achieved. The light output can then be generated with a strength which causes the output to be substantially "even" or "constant" in a circumferential direction, along the axial direction of the flexible LED linear light component 102.

To achieve an appropriate uniformity of light intensity along the axial length of the translucent housing 120, reference is made to the interior structure of the area encased by the translucent housing 120. This area is illustrated in FIG. 4 as interior 140. This interior 140 can be characterized as having an "interior height IH" as also shown in FIG. 4. This interior height IH, which is also characterized as interior height 152, extends from what could be characterized as the LED base level 156 which essentially exists on the same level as the uppermost lens portion of each of the LEDs 106. This interior height IH then extends upwardly in a perpendicular direction relative to the plane of the LEDs 106, to the interior apex 154. This interior apex 154 can be characterized as the uppermost position of an inner surface 142 of the translucent housing 120. In accordance with certain novel concepts of the invention, the open interior 140 is filled with air or a silicone gel 158, again as shown in FIG. 4. If the interior height IH is of a sufficient value, and assuming that the contours of an inner surface 142 have a curvature substantially corresponding to the curvature shown in FIG. 4, a significant change in "transmissibility" from the air or silicone gel to the translucent housing material will be existent. Further, with the sufficiency of the interior height IH, and appropriate positioning of adjacent LEDs 106, the intersecting ray patterns from the adjacent LEDs can combine and interfere with each other. That is, under these appropriate circumstances, the ray patterns can cause both combination and interference of the light rays. Interference is well known and is a phenomenon in which two rays will superimpose and form a further resultant wave of greater or lower amplitude. This type of interference usually refers to the interaction of waves that are correlated or coherent with each other, either because they came from the same source or, as in this case, because they have the same or nearly the same frequency. Such intersecting ray patterns readily form combining waves. With the appropriate dimensions regarding interior height IH and the spacing of the individual LEDs 106, the resultant intersecting ray patterns from the adjacent LEDs can combine and interfere prior to hitting the inner surface 142 of the translucent housing 120. In accordance with all of the foregoing, the change in transmissibility from the air or silicone to the housing material, plus the light scattering occurring through reflection and transmission will cause the diffusion pattern of the light to be extremely even or constant across the axial length of the LED component. With this phenomena occurring, the diffusion pattern is extremely even or constant across the entirety of the axial length of the LED stream. This occurrence virtually eliminates the well-known "hot spots" which are often created by individual LEDs which are used in strips where there are relatively small distances between the LEDs without the gap or open interior 140 formed by the appropriate dimensions and the use of air or silicone gel as a "fill" for the interior of the translucent housing 120. The general concepts associated with hot spots were previously discussed in detail in the section entitled "Background Art" of this application. Again, the size of the open interior 140, and particularly the size of the interior height IH, in combination with the open interior being filled with air or silicone gel, results in the diffusion pattern for the LED light intensity to be extremely even or constant along the axial length of the flexible LED linear light component 102. This diffusion pattern, which essentially eliminates hot spots created by the individual LEDs 106, results from both the change in transmissibility from the air or silicone gel within the open interior 140 to the translucent housing 120, in combination with the sufficiency of the interior height IH.

The designer may wish to obtain a diffusion pattern which is not necessarily an attempt to provide uniformity of light intensity in radial and circumferential directions. Instead, the designer may wish to obtain other patterns. The designer can achieve light intensity variation and diffusion variation by other variations in thicknesses of the translucent housing, in the radial and/or circumferential directions.

Turning to other aspects of the diffused flexible LED linear light assembly 100, the assembly 100 further includes a pair of end caps, comprising an end cap lead end 170 and an end cap trailing end 190. The end cap 170 is illustrated in FIGS. 1, 3 and 5-7 in combination with the translucent housing 120. Further, the end cap 170 is shown in detail in a stand-alone configuration in FIGS. 8, 9 and 10. Correspondingly, the end cap trailing end 190 is shown in detail in a stand-alone configuration in FIGS. 11-16. The end caps 170 and 190 are fitted on the ends of the translucent housing 120, and are used to enclose and encase the flexible LED linear light component 102 within the lower portion of the interior 140 of the housing 120. Further, as described in subsequent paragraphs herein, the trailing end end cap 190 includes means for permitting the electrical pigtails 108 to be received through the end cap 190 for providing electrical power between the external source 110 and the flexible LED linear light component 102.

Figures 8, 9:
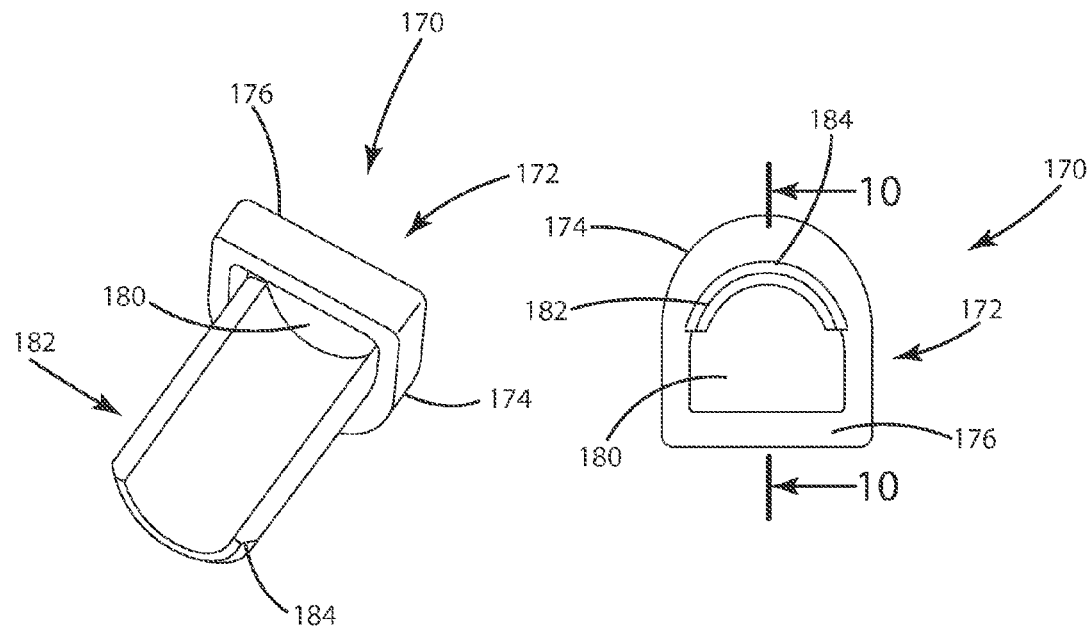
Figure 10:
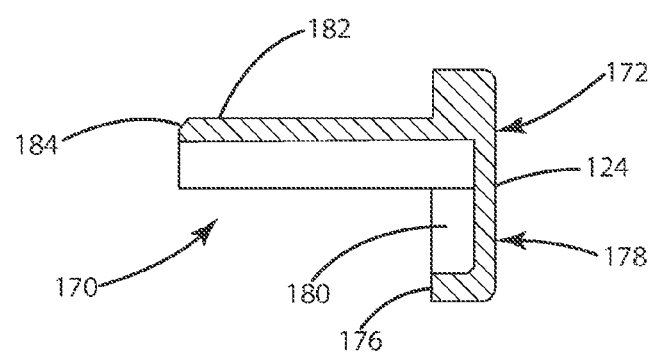
FIG. 10 is a sectional, side view of the end cap lead in shown in FIG. 9, taken along section lines 10-10 of FIG. 9.
Figure 11:
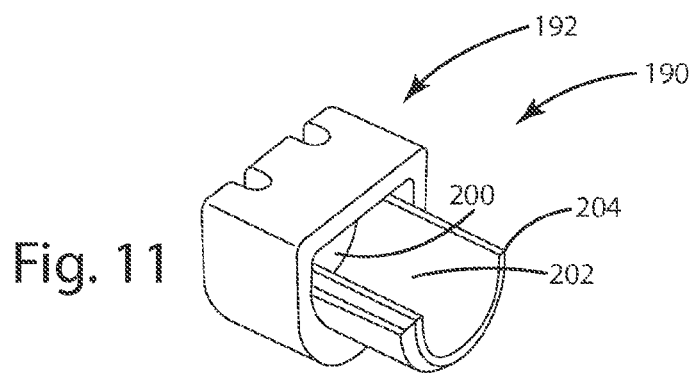
FIG. 11 is an underside perspective view of the end cap trailing end of the diffused flexible LED linear light assembly shown in FIGS. 1-4.
Figures 12, 13:
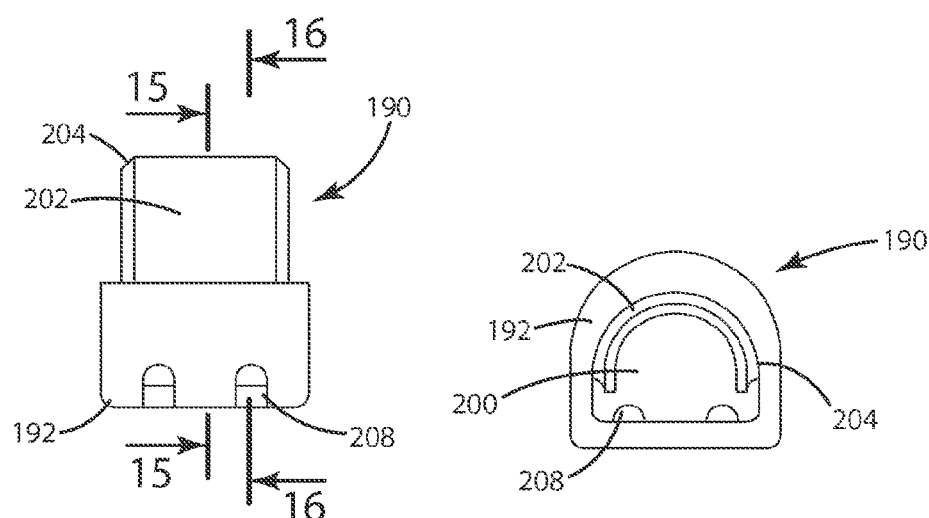
FIG. 12 is an underside elevation view of the end cap trailing end shown in FIG. 11.
FIG. 13 is an end, elevation view of the end cap trailing end shown in FIG. 11.
Figures 14, 15, 16:
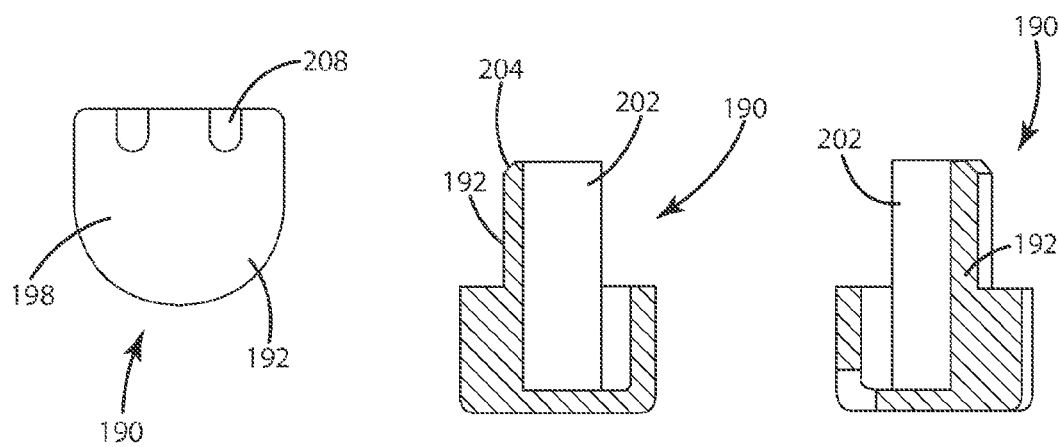
FIG. 14 is an end view of the end cap trailing end shown in FIG. 11, as viewed from the exterior of the diffused flexible LED linear light assembly, and as further shown in an upside down configuration.
FIG. 15 is a sectional, side view of a portion of the end cap trailing end shown in FIG. 12, and taken along section lines 15-15 of FIG. 12.
FIG. 16 is a further side, sectional view of the trailing end end cap shown in FIG. 12, taken along section lines 16-16 of FIG. 12, and effectively showing a side, sectional view of the end cap trailing end from an opposing direction of the side, sectional view shown in FIG. 15.
Figure 17:
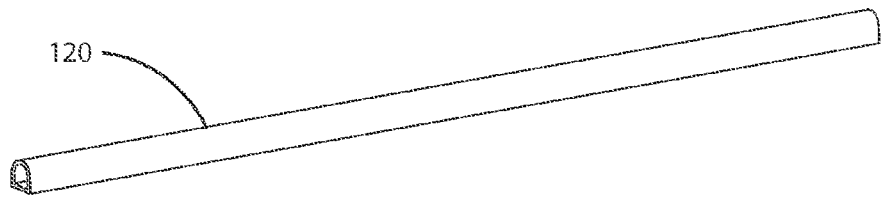
FIG. 17 is a perspective view of the translucent housing of the diffused flexible LED linear light assembly as shown in FIGS. 1-4.
Figure 18:
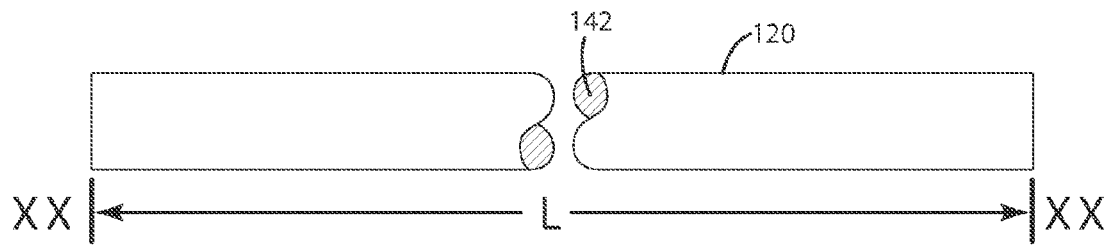
FIG. 18 is a side, elevation view of the translucent housing shown in FIG. 18.
Figure 19:
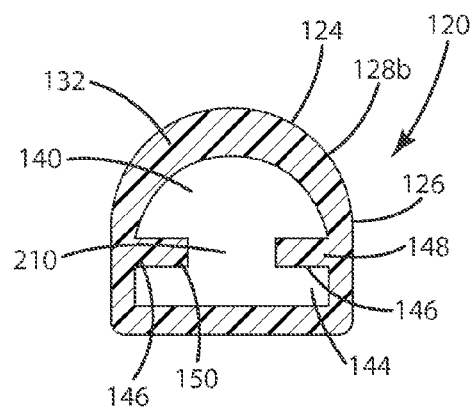
FIG. 19 is a sectional, end view of the translucent housing shown in FIG. 18.

Turning first to the end cap lead end 170 and with specific reference to FIGS. 8, 9 and 10, the end cap 170 provides a sealed connection with the translucent housing 120. The end cap 170 includes an outer body 172, as primarily shown in FIGS. 8 and 9. As particularly shown in FIG. 9, the outer body 172 includes a curved section 174 and a lower flat section 176. The section 174 and section 176 are preferably integral with each other. Of particular importance, the outer body 172 is sized and configured so as to essentially "match" the cross sectional configuration of the translucent housing 120. With respect to the outer body 172, the body 172 comprises an outer face 178, primarily shown partially in FIG. 3 and in FIG. 10. On an opposing side of the outer face 178, the outer body 172 includes a hollow interior area 180, again shown primarily in FIGS. 8, 9 and 10.

The end cap 170 further includes an inner projection 182. The inner projection 182 is shown in FIGS. 8 and 9, and also shown in the sectional view of FIG. 10. The inner projection 182, as apparent from the drawings, is of an arcuate shape with a partially beveled end 184 at the terminal portion of the projection 182. The inner projection 182 is sized and configured so as to be received within the curved or arcuate section 124 of the translucent housing 120. In fact, the translucent housing 120 and the end cap 170 are particularly sized and configured so that the inner projection 182 abuts the inner surface 142 of the housing 120. This configuration is particularly shown in FIG. 7. With reference to both FIGS. 5 and 7, the end cap 170 is sealed with the translucent housing 120 through the use of an adhesive 186. The adhesive 186 can be any of a number of commercially available adhesives suitable for bonding the materials. Also, glues or similar sealing agents, which are preferably water resistant and UV-stable can be utilized. For further sealing of the end cap 170 to the translucent housing 120, coating material 188 having a silicone base (see FIGS. 5 and 7) can be utilized. With this configuration, and again with the appropriate sizing of the various elements, the end cap 170 is secured to the translucent housing 120 in a manner so that the end cap 170 mounts flush with the outer surface of the translucent housing profile. This configuration is in contrast to one where a "step" or other discontinuity is formed, which would occur if the end cap 170 was located "outside" of the profile of the translucent housing 120. This flush-type configuration between the translucent housing 120 and an end cap is particularly shown in FIG. 1 with respect to the translucent housing 120 and the end cap trailing end 190. With this configuration utilizing the inner projection 182 and providing for a flush mounting between the end cap 170 and the translucent housing 120, the mounting of the end cap 170 is facilitated and made easier for the assembler. In addition, the aesthetics of the overall diffused flexible LED linear light assembly 100 are significantly improved, relative to a configuration where the end cap is not flush mounted with the housing.

The end cap trailing end 190 will now be described, primarily with respect to FIGS. 1, 3, 5, 7 and 11-16. It should be noted that the trailing end end cap 190 is substantially similar in sizing and construction to the end cap lead end 170, but with certain additional elements primarily related to providing means for receiving the electrical pigtails 108. More specifically, the end cap 190, like the end cap 170, includes an outer body 192, as primarily shown in FIGS. 11, 12, 15 and 16. As particularly shown in FIG. 11, the outer body 192 includes a curved section 194 and a lower flat section 196. The section 194 and section 196 are preferably integral with each other. Of particular importance, the outer body 192 is sized and configured so as to essentially "match" the cross-sectional configuration of the translucent housing 120. With respect to the outer body 192, the body 192 comprises an outer face 198, primarily shown in FIGS. 1 and 14. On an opposing side of the outer face 198, the outer body 192 includes a hollow interior area 200, primarily shown in FIGS. 3, 11 and 13.

Similar to the end cap lead end 170, the end cap 190 further includes an inner projection 202. The inner projection 202 is particularly shown in FIGS. 3, 11-13 and 16. The inner projection 202, as apparent from the drawings, is of an arcuate shape with a partially beveled end 204 at the terminal portion of the projection 202. The inner projection 202 is sized and configured so as to be received within the curved or arcuate section 124 of the translucent housing 120. In fact, the translucent housing 120 and the end cap 190 are particularly sized and configured so that the inner projection 202 abuts the inner surface 142 of the housing 120. This configuration is shown in FIG. 7. With reference to both FIGS. 5 and 7, the end cap 190 is preferably sealed with the translucent housing 120 through the use of the adhesive 186 previously described with respect to end cap 170. For a further sealing of the end cap 190 to the translucent housing, coating material 188 having a silicone base (see FIGS. 5 and 7) can be utilized. With this configuration, and again with the appropriate sizing of the various elements, the end cap 190 is secured to the translucent housing in a manner so that the end cap 190 mounts flush with the outer surface of the translucent housing profile. This configuration is in contrast to one where a "step" or other discontinuity is formed, which would occur if the end cap 190 was located "outside" of the profile of the translucent housing 120. This flush-type configuration between the translucent housing and the end cap 190 is particularly shown in FIG. 1. In accordance with the invention, and with this configuration utilizing the inner projection 202 and providing for a flush mounting between the end cap 190 and the translucent housing 120, the mounting of the end cap 190 is facilitated and made easier for the assembler. In addition, the aesthetics of the overall diffused flexible LED linear light assembly 100 are significantly improved, relative to a configuration where the end cap is not flush mounted with the housing.

As earlier stated, the end cap trailing at 190 is substantially similar to the end cap lead end 170. One distinction relates to the end cap 190 having means for receiving elements for connecting the flexible LED linear light component 102 to the previously described external source of electrical power 110. Specifically, and as particularly shown in FIGS. 1, 3, and 11-16, the end cap trailing end 190 includes a pair of connection apertures 208. The connection apertures 208 are utilized to receive the electrical pigtails 108 which were previously described herein with respect to FIG. 20, and provide components for purposes of transmitting electrical power from the external source of electrical power 110 to the flexible LED linear light component 102. These connection apertures 208 are not an absolute necessity for the end cap lead end 170, but could be provided if required for purposes of "stringing together" a number of flexible LED linear light assemblies 100.

As previously described, the translucent housing 120 includes an open interior area 140, as shown, for example, in FIGS. 2, 4, 7 and 19. Below the open interior area 140 is an area within the translucent housing 120 which is referred to in the drawings as hidden area 144. This hidden area 144 is also shown in FIGS. 2, 4, 7 and 19. The open interior area 140 and the hidden area 144 are formed and separated by a pair of inwardly directed projections 146. These inwardly directed projections 146 are formed integrally with the translucent housing 120 as the lower portion of the translucent curved or arcuate section 124. These projections 146 are shown as the first inner projection 148 and second inner projection 150. These inner projections form a channel 210 which separates the open interior area 140 from the hidden area 144. By adding the channel 210 formed by the inwardly directed projections 146, and by locating the projections on the bottom inside portion of the translucent housing 120, it is then possible to locate the flexible LED linear light component 102 securely against the bottom of the flat base section 122.

The prior paragraphs and FIGS. 1-21 disclosed and illustrated, respectively, concepts associated with the Camarota Application and general background regarding LED linear light technology. The principles of the present invention will now be disclosed, by way of example, in an embodiment of an LED linear light assembly 300 having a transparent bottom. The LED linear light assembly 300 is illustrated in perspective view in FIG. 22. An end view and cross-section of the light assembly 300 is shown in FIG. 23. As previously described with respect to the Camarota Application, LED linear light assemblies can be constructed through an extrusion process. With the extrusion process, the housing 320 for the light assembly is first formed. Following the formation of the housing 320 through the extrusion process, an LED liner light component 302 consisting of a continuous and elongated linear base 304 with individual LEDs 306 mounted thereon is essentially "pulled" through the extrusion of the light assembly housing 320. The base 302 operates as a printed circuit board (PCB) for the LED circuitry. It will be appreciated, however, that the LED linear light component 302 may be assembled with the housing 320 in other various manners, specifically based on the type of extrusion process used, as descried in further detail below.

The manufacturing process may involve the manufacture of a housing 320 and an LED linear light component 302 (consisting of the base and individual LEDs) of substantial length. In some instances, the length of the manufactured and resultant LED linear light assembly 300 is sold through retail channels "as is" with respect to the length. In other instances, the manufacturer may wish to market the LED linear light assemblies optionally cut at any desired length. When using an extrusion process, the housing 300 may be continuously formed and cut at any desired length.

However, as subsequently described herein, the circuit configurations of the individual LEDs 306 on the linear base or PCB 304 requires that the extruded LED linear light assembly 300 be cut only at certain positions along the length of the light assembly, relative to the positioning of the individual LEDs 306 and connector pads 315 positioned on the linear base 304. As described in further detail below, cutting at the specified locations allows both the cut piece and remaining piece to be used without further trimming or cutting, thus reducing scrap and eliminating unnecessary additional steps.

This requirement of needing to precisely cut segments of the linear light assembly only at specific locations relative to the circuitry structure and positioning of the LED linear light component 302 has presented significant problems in the past with respect to the manufacturer being able to determine where to cut. Specifically, once the housing 320 is formed and the PCB or linear component 302 is positioned in the housing 320, it is difficult to know where the assembly 300 should be cut because the pads or desired cut locations 323 are not visible through the housing 320.

This same problem has existed in the field with respect to customers in the retail chain from wholesalers to end users. For example, an end user may wish to purchase an extended length of a continuous LED linear light assembly, and then have the capability of cutting the assembly into desired linear light assembly segments. However, as with the manufacturer, the end user has not had the capability of readily determining the position of the individual LEDs 306 and connector pads 315 associated with the linear light component 302 within the housing 320.

As described above, the house 320 may include a first section forming a base or bottom portion 322 and a second section forming an upper portion 324 of the housing 320. The upper portion 324 may be curved or arcuate. Altering the translucence of the entire housing 320 is not a workable solution to the issues described above because the opacity of the upper arcuate portion 324 is specifically designed to diffuse the lighting evenly and altering the opacity of this portion would reduce the uniformity of the light. Therefore, the upper portion 324 must retain an opacity that allows light to pass through it while still adequately diffusing the light, while the bottom portion 322 must be translucent enough to allow a user to visualize any markings or indicia of cut locations. In other words, the bottom portion 322 must be more translucent than the upper portion 324 to meet both the desired diffusion properties of the housing while still allowing for a user to visualize cut location indicia.

The LED linear light assembly 300 in accordance with the invention achieves a substantial advance in LED light technologies and overcomes the problems associated with being able to accurately cut an extended length of an LED linear light assembly 300 either at the manufacturing site or in the field. This advantageous assembly is achieved through the forming of the continuous, elongated linear bottom portion 322 of the housing 320 with a transparent or clear material. This advantage in the formation of accurately produced LED linear light assembly segments is achieved regardless of whether the overall housing of the linear light assembly has any diffusion properties. Also, advantages in accordance with the invention are achieved independent of whether the LED linear light component 302 or housing 320 is formed as a substantially flexible component, semi-rigid component or even a component of substantial rigidity.

With the manufacturing process, another advantage in accordance with the invention can be achieved with respect to the positioning of the linear light component within the housing. In the past, the extrusion process for the LED linear light assembly housing has consisted of a single extrusion process. This single extrusion process has been utilized even when the bottom of the extruded housing has been formed of a different material than the remainder of the housing. For example, in the Camarota Application, the bottom of the housing is formed of an opaque material. When the entirety of the housing is formed through the single extrusion process, the LED linear light component comprising the linear base and the individual LEDs mounted thereon is typically inserted through an end of the linear light assembly. This insertion or "threading" of the linear light assembly into the interior of the housing can be somewhat difficult, particularly with respect to accurately positioning the light component within the housing. This is particularly true for significantly flexible linear light components, in that as the flexibility increases, the ability to manually or mechanically manipulate the component significantly decreases. This is also true as the length of the housing increases.

To overcome the problems associated with insertion or threading of the light component into the housing, a manufacturing process in accordance with the invention can include the concept of separately extruding the clear bottom 322 of the housing from the extrusion process which forms the remainder 324 of the housing. When the separate extrusion processes are utilized, the linear LED light component 302 consisting of the PCB base 304 and individual LEDs 306 can then be laid into the housing interior before the clear bottom 322 is coupled to the remainder of the housing 324. With this process, the need for inserting or otherwise threading the linear light component into an end of the housing can be avoided.

In an alternative embodiment, the housing 320 may be extruded in a single step. For example, the clear bottom portion 322 and the remaining portion 324 may be co-extruded in a single extrusion process to form the unitary housing 320.

Turning now to FIGS. 22-26, the continuous LED linear light assembly 300 illustrated comprises what can be characterized as a continuous LED linear light component 302 which extends longitudinally through the assembly 300. The continuous LED linear light component 302 comprises a continuous and elongated linear base 304. The base 304 can be characterized as the printed circuit board or "PCB" for the linear light assembly 300. Mounted on the elongated linear base 304 are a series of individual LEDs 306. It will be appreciated, that while the linear light component 302 is generally described herein as an LED linear light component, the light component may include any appropriate or known type of lights. The LEDs 306 are spaced longitudinally along the elongated direction of the component 302. Each of the LEDs 306 can be in the form of a conventional diode configuration. This diode configuration can include LED clusters or arrays 319 as shown in FIGS. 24 and 25, and discussed in greater detail in subsequent paragraphs. FIG. 20, related to the Camarota Application, illustrates a relatively simplified schematic diagram of the circuitry of LEDs as mounted on the base or PCB 304. As previously described, LEDs may be mounted on a printed circuit board, such as a flexible polymer-based circuit board, where the LEDs 306 are mounted on the base 304 in a relatively low profile design and small, but efficient size. The base 304 and LEDs 306 might be manufactured in various lengths and widths, so as to accommodate the desired height and sizing of the LED linear light assembly 300. In addition to the linear base 304 and the LEDs 306, the LED linear light component 302 is connected to a pair of electrical connectors, commonly referred to as "pigtails." These electrical connectors or electrical pigtails are shown in FIG. 25 as pigtails 308. The pigtails 308 are shown as being interconnected between the base 304 and an external source of electrical power 310. The pigtails 308 comprise a protective cable 312 having conductive wires 314 extending therethrough.

As further shown in FIGS. 24 and 25, the pigtails 308 are connected in a suitable manner to a pair of connector pads 315. The power connection pads 315 are each connected to a separate one of the pigtails 308. With the use of LEDs 306, power is always supplied in the form of DC power. Accordingly, one of the power connection pads 315 is associated with a pigtail 308 which can be characterized as a "positive" terminal or path for power to the LEDs 306. Correspondingly, the other power connection pad 315 and other electrical pigtail 308 can be characterized as a negative terminal or path 318. As earlier described with respect to the Camarota Application, the pigtails 308 can be connected to the power connection pads 315 through various means. As an example, the conductive wires 314 can be exposed by "stripping back" the protective cables 312, and one end of the wires 314 can be connected to one end of the string of individual LEDs 306 through the power connection pads 315 and base 304.

Basic concepts associated with the formation of a housing for encasing the LED linear light assembly 300 have been described in detail with respect to the Camarota Application. With the assembly 300, a housing 320 is formed. The housing 320 can be any of a number of differing types of housings utilized with linear light assemblies. For example, as discussed above, the housing 320 may include a curved or arcuate section 324 which is translucent or otherwise exhibits various degrees of "partial" translucence. Also, the curved section 324 may or may not exhibit diffusion properties, and may vary in thickness or otherwise comprise various other physical and optical properties. The entirety of the housing 320 is formed not only with the curved or arcuate section 324, but also with a bottom section 322 as shown in each of the drawing FIGS. 22-26. The bottom section 322 can be rectangular in design and comprise an elongated configuration coinciding with the configuration and length of the curved section 324.

Figure 27:
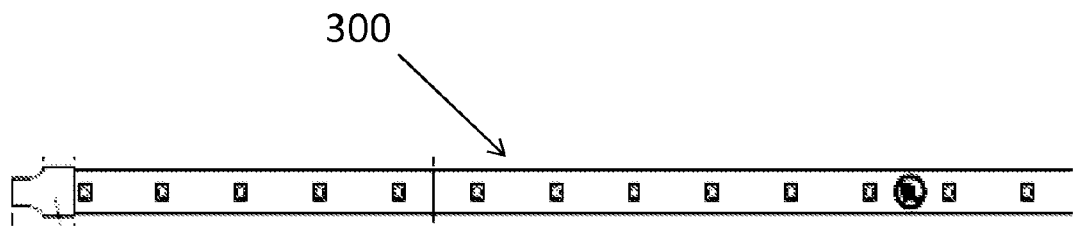
FIG. 27 is a top view of a liner light assembly housing that is generally flat and rectangular in cross-section.
Figure 28:
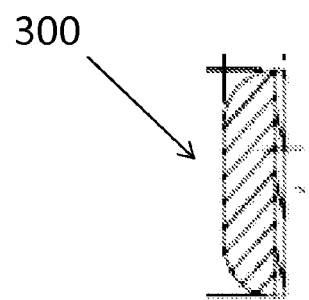
FIG. 28 is a cross-sectional view of a liner light assembly housing that is generally flat and rectangular in cross-section.

It will be appreciated that the shape and design of the bottom section 322 top section 324 may be any appropriate shape and design and are not limited to the embodiments shown in the Camarota Application. By way of example, FIGS. 27-28 illustrate a housing 300 that is generally flat includes a generally rectangular cross-section, as shown in FIG. 28. However, any appropriate shape, size, or design of housing 300 may be used.

In accordance with the invention, the bottom section 322 can be constructed of a material which exhibits transparency so as to provide for a "clear" bottom section 322 through which a manufacturer or installer can visually observe the LED linear light component 302. A series of laterally extending indicia or "cross" cut lines 323 may be formed on the portion of the linear light component 302 that is adjacent to or visible through the bottom section 322. The cut lines 323 are spaced apart at intervals and positioned relative to mid-points of connector pads 316 which are shown in a spaced apart configuration primarily in FIGS. 24 and 25. With the clear bottom section 322, the manufacturer or installer can view the cut lines 323 and cut an elongated strip of the continuous LED linear light assembly 300 into segments of desired length.

The importance of achieving accuracy with respect to cutting the linear light assembly 300 into segments of desired length will now be explained. In the example embodiment illustrating the linear light assembly 300 in FIGS. 22-26, the individual LEDs 306 are shown as being formed into separate LED clusters or arrays 319. This clustering of the LEDs is particularly shown in FIG. 25. With reference thereto, each LED cluster or array 319 is formed from a circuit configuration of three individual LEDs 306. At this time, it should be emphasized that the cluster formations with three LEDs 306 is merely one embodiment of an LED circuit configuration which can be utilized in accordance with the invention. In the particular embodiment of the linear light assembly 300, each LED cluster 319 utilizes a series of three LEDs 306 which are connected in what can be characterized as a "series/parallel" configuration. Such a configuration of three LED clusters is illustrated in FIG. 20 with respect to the Camarota Application. With reference thereto, the LEDs L1, L2 and L3 form one cluster, while LEDs L4, L5 and L6 form another cluster. In the first cluster, LEDs L1, L2 and L3 are connected in a series configuration. Similarly, LEDs L4, L5 and L6 in the second cluster are also in a series configuration. However, these clusters are connected across the positive and negative paths formed by the electrical pigtails 108 for the external source of electrical power 110, as further shown in FIG. 20. Accordingly, while the individual LEDs 306 of a specific cluster 319 are connected in series configuration, each cluster is connected in a parallel configuration relative to the other clusters.

Returning to FIG. 25, the three individual LEDs 306 associated with each of the LED clusters 319 are connected in a series configuration, relative to the incoming power 310. However, each of the three LED clusters 319 is connected in a parallel configuration relative to each of the other LED clusters 319.

It is apparent to those having knowledge of the electrical arts that the properties of the power source 310 and the number of LEDs 306 within a cluster 319 is of primary importance with respect to outputs of the assembly 300. For purposes of the description, use of resistors and resistance circuit configurations will be ignored. The power source 310 may be provided by a 9-volt battery or similar power means. With 9 volts being provided across each LED cluster 319 comprising three LEDs 306, the voltage across each of the series connected LEDs 306 would be approximately three volts. This voltage will determine LED light intensity, light temperature and the like.

To ensure proper operation of the linear light component segments formed after cutting of the continuous linear light assembly 300, it is of primary importance that cuts do not occur between any series connected LEDs, or otherwise between LED clusters 319 which are immediately adjacent other LED clusters 319 without connector pads 316 being positioned there between. Such inadvertent cutting procedures can result in complete power loss for one or more of the LEDs 306, or otherwise result in a reduction or increase in the voltage applied across any given LED 306. Moreover, the positioning of the cut lines 323 ensures that the cuts are uniformly made along the length of the assembly 300. This is important, specifically for use of the linear light assembly 300 with any type of connector or interface that requires coupling with the linear light component 302 at a specific orientation or arrangement. By maintaining consistent cut lines along the linear light assembly 300, the location of the connector pads 316 may remain consistent with respect to an end of the linear light assembly, thus allowing both the cut piece and remaining piece to be used with a connector or interface component without the need for additional trimming. For these reasons, appropriate cutting positioning is of significance.

Other concepts in accordance with the invention relate specifically to the manufacturing process for formation of continuance LED linear light assemblies 300 and other assemblies in accordance with the invention. Specifically, these other concepts relate to the activities associated with respect to the positioning of the linear light component 302 within the housing 320. In the past, the extrusion process for the typical LED linear light assembly housing has consisted of a single extrusion process. This single extrusion process has been utilized even when the bottom of the extruded housing had been formed of a different material than the remainder of the housing, as would be the case for assemblies in accordance with the invention, where the bottom section 322 is transparent or otherwise sufficiently clear so as to provide visibility for a manufacturer or installer of the light component 302. Thus, the present linear light assembly 300 maybe formed through a single co-extrusion process that yields a unitary housing having a top section 324 with a first translucency and bottom section 322 with a second translucency greater than the first translucency. Also, as an example, the Camarota Application discloses the concept of the bottom of the housing being formed of an opaque material.

When the entirety of the housing is formed through a single extrusion process, the LED linear light component 302 would typically be inserted through an end of the housing 320. This insertion or "threading" of the linear light component 302 into the interior of the housing 320 can be somewhat difficult, particularly with respect to accurately positioning the light component 302 relative to the housing 320. This is particularly true for a significantly flexible linear light component 302. That is, as the flexibility increases, the ability to manually or mechanically manipulate the component 302 decreases. This is also true as the length of the housing 320 and the linear light component 302 increase.

To overcome these problems associated with inserting or threading the light component 302 into the housing 320, a manufacturing process in accordance with certain concepts of the invention, include separately extruding the clear bottom 322 of the housing 320 from the extrusion process which forms the curved or arcuate section 324. When these separate extrusion processes are utilized, the LED linear light component 302, consisting of the continuous elongated linear base 304 and the individual LEDs 306 (formed in LED clusters or arrays 319) can then be laid into the interior of the curved or arcuate section 324 of the housing 320 before the clear bottom 322 is coupled to the housing section 324. With this process, the need for inserting or otherwise threading the linear light component 302 into an end of the housing 320 can be avoided.

It will be apparent to those skilled in the pertinent arts that other embodiments of LED linear light assemblies in accordance with the invention can be designed. That is, the principles of light assemblies in accordance with the invention are not limited to the specific embodiments described herein. Accordingly, it will be apparent to those skilled in the arts that modifications and other variations of the above-described illustrative embodiments of the invention may be effected without departing from the spirit and scope of the novel concepts of the invention.

The invention claimed is:

1. A linear light assembly comprising:
an elongated housing having a length, said housing comprising:
a first section extending along the length of said housing to form a base of said housing;
a second section extending along the base of said housing, said second section connected to said first section to form an opening therebetween;
a linear light component located within said opening, said linear light component comprising a circuit board, said circuit board having a first face and an opposed second face, said first face having one or more light elements disposed thereon, said second face having one or more cut position indicators thereon, said second face arranged generally parallel with and adjacent to said first section;
wherein said first section and second section are at least partially translucent to allow light to pass therethrough, and wherein said first section is made of a less opaque material than said second section to allow visibility of the cut position indicators on the second face of the circuit board.

2. The linear light assembly of claim 1, wherein said elongated housing is flexible.

3. The linear light assembly of claim 1, wherein said linear light component is flexible.

4. The linear light assembly of claim 1, wherein the cut position indicators comprise connector pads that electrically connect a first group of one or more lights on said linear light component with a second group of one or more lights on said linear light component.

5. The linear light assembly of claim 4, wherein said linear light component comprises at least two connector pads, one of said connector pads electrically connecting said linear light component to a positive electrical signal, and another of said connector pads electrically connecting said linear light component to a negative electrical signal.

6. The linear light assembly of claim 1, wherein said first and section sections are unitarily formed through an extrusion process.

7. The linear light assembly of claim 1, wherein said first and second sections are separately formed and fixed together.

8. The linear light assembly of claim 1, wherein said light elements on said linear light component are arranged to direct light toward said second section.

9. The linear light assembly of claim 1, wherein said light elements on said linear light component are LED lights.

10. The linear light assembly of claim 9, wherein said LEDs are arranged in LED clusters, where each of said LED clusters comprises a predetermined number of LEDs.

11. The linear light assembly of claim 10, wherein said predetermined number of LEDs of each LED cluster are configured in a series circuit configuration relative to each other.

12. The linear light assembly of claim 10, wherein at least two of said LED clusters formed on said LED linear light component are in a parallel circuit configuration, relative to each other.

13. A method of forming a linear light comprising:
extruding a first portion of a housing forming an elongated based section;
extruding a second portion of a housing forming an elongated top section;
connecting a linear light component to said first portion said linear light component comprising a circuit board, said circuit board having a first face and an opposed second face, said first face having one or more light elements disposed thereon, said second face having one or more cut position indicators thereon, said second face arranged generally parallel with and adjacent to said first section;
connecting said first portion and said second portion to form an elongated housing having said linear light component positioned between said first portion and second portion of said housing; and
wherein said first portion and said second portion are at least partially translucent to allow light to pass therethrough, and wherein said first portion is made of a less opaque material than said second portion to allow visibility of the cut position indicators on the second face of the circuit.

14. A method of forming a linear light comprising:
extruding an elongated linear housing comprising:
a first portion forming an elongated based section;
a second portion forming an elongated top section;
wherein said first portion and second portion are unitarily formed through said extruding process and include an opening therebetween;
inserting a linear light component into said opening said linear light component comprising a circuit board, said circuit board having a first face and an opposed second face, said first face having one or more light elements disposed thereon, said second face having one or more cut position indicators thereon, said second face arranged generally parallel with and adjacent to said first section;
wherein said first portion and said second portion are at least partially translucent to allow light to pass therethrough, and wherein said first portion is made of a less opaque material than said second portion to allow visibility of the cut position indicators on the second face of the circuit.

* * * * *